July 26, 1932.  C. S. HALL  1,868,975
PROPELLER DRIVE MECHANISM
Filed Nov. 14, 1930  2 Sheets-Sheet 1
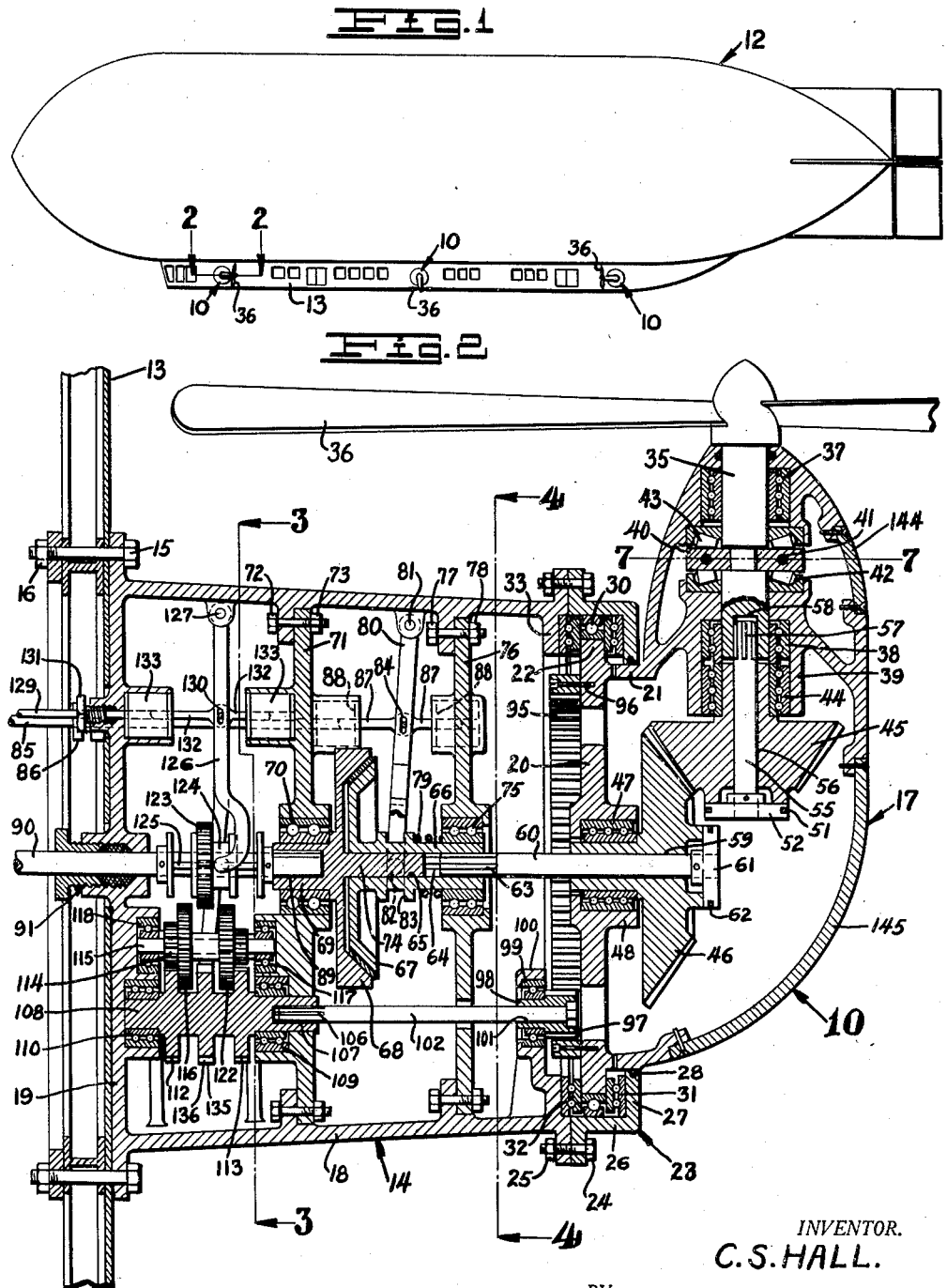
INVENTOR.
C. S. HALL.
BY
ATTORNEY.

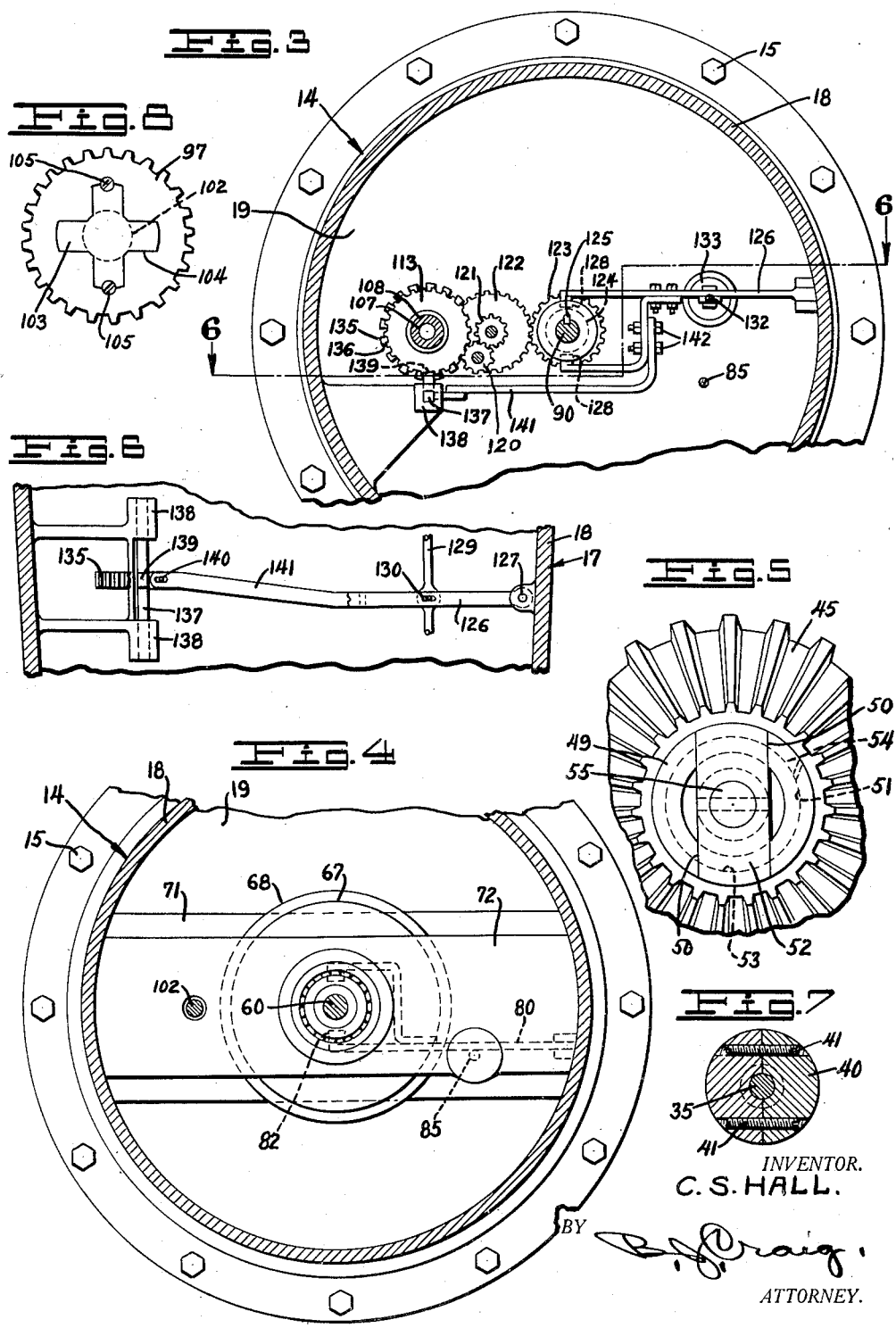

Patented July 26, 1932

1,868,975

UNITED STATES PATENT OFFICE

CHARLES S. HALL, OF LOS ANGELES, CALIFORNIA

PROPELLER DRIVE MECHANISM

Application filed November 14, 1930. Serial No. 496,977.

This invention relates to improvements in propelling mechanisms.

The present invention is an improvement over that shown in my prior Patent No. 1,652,098 granted February 14, 1928, and my Patent No. 1,740,088 granted January 3rd, 1928, and my co-pending application Serial No. 376,328 filed July 6th, 1929.

The general object of my invention is to provide an improved aircraft propelling device wherein the propeller is mounted in a novel manner so that it may be moved to positions to produce a thrust effect in various directions.

Another object of the invention is to provide an aircraft propeller mounted to move so that the direction of thrust may be shifted and wherein means is provided for disengaging the propeller drive means when the propeller is being shifted.

A further object of the invention is to provide a full floating drive means for an aircraft propeller.

A still further object of the invention is to provide a novel mounting means for an aircraft propeller.

Other objects and the advantages of this invention will be apparent from the following description taken in connection with the accompanying drawings wherein:—

Fig. 1 is a side elevation of an aircraft having propellers thereon embodying the features of my invention.

Fig. 2 is an enlarged fragmentary sectional view through the propeller mountings and associated parts taken on line 2—2 of Fig. 1.

Fig. 3 is a section taken on line 3—3 of Fig. 2.

Fig. 4 is a section taken on line 4—4 of Fig. 2.

Fig. 5 is an enlarged face view of one of the floating shaft connecting means.

Fig. 6 is a section taken on line 6—6 of Fig. 3 showing only the locking mechanism and Fig. 7 is a section taken on line 7—7 of Fig. 2.

Fig. 8 is a face view of one of the gears showing the shaft connecting means.

Referring to the drawings by reference characters I have indicated my invention generally at 10 and have shown it as operatively mounted on an aircraft which is indicated generally at 12 and includes a body portion 13. It will be understood that although I have shown my improved propeller mechanism in combination with a lighter-than-air type of craft such as a dirigible, that it may be used in combination with heavier-than-air craft such as an airplane or a helicopter.

The device 10 comprises a stationary support 14 which is secured to the body 13 of the aircraft by bolts 15 and nuts 16, and a movable housing 17 which is rotatable relatively to the support 14. The support 14 is preferably circular in cross section and includes a side wall 18 and a rear wall 19.

The housing 17 includes a rear wall 20 from which an annular portion 21 extends. This portion 21 is coaxial with the support 14 and the rear wall extends beyond the annular portion 21 to form an annular flange 22.

The housing 17 is retained in position on the support 14 by a retaining ring 23 which is secured to the support by bolts 24 and nuts 25 and includes an outer annular wall 26 and a front annular wall or flange 27 which fits snugly around the annular portion 21 of the housing 17. On the inner edge of the front wall 27 I provide an oil packing member 28 which tightly engages the outer face of the annular portion 21 of the housing 17.

The housing 17 is supported by an antifriction bearing 30, the inner raceway of which engages the outer periphery of the flange 22 and the outer raceway engages the inner face of the annular wall 26 of the retaining ring 23.

The outer face of the flange 22 engages the inner raceway of an antifriction bearing 31 the outer raceway of which engages the inner face of the front wall 27 of the retaining ring 23. The other or inner face of the flange 22 engages one raceway of an antifriction bearing 32, the other raceway of which engages an inner annular flange 33 on the support 14.

Positioned in the housing 17 and extending at right angles to the axis of the support 14 I provide a propeller hub shaft 35 on which is mounted a propeller 36 of any desired type. The propeller hub shaft 35 is supported in an antifriction bearing 37 in the housing and in a second antifriction bearing 38 in a boss 39 integral with the housing 17. Intermediate the bearings 37 and 38 the shaft 35 is provided with a reduced portion around which I secure a split collar 40 which is secured together by bolts 41. One face of the collar 40 engages an antifriction thrust bearing 42 while the opposite face engages an antifriction thrust bearing 43. Supported in an antifriction bearing 44 in the boss 39 I provide a bevel gear 45 which meshes with another bevel gear 46 in a boss 48 on the rear wall 20 of the housing 17.

The gear 45 includes on its outer face an annular ring boss 49 which is provided with opposed recesses 50 in its front face and in the outer peripheral face of the boss 49 I provide an annular groove 51 (see Fig. 5). Positioned in the recesses 50 I provide a bar 52 which is provided with an annular groove 53 to match the groove 51 of the boss 49. Positioned in the groove 51 of boss 49 and the groove 53 of the bar 52 I provide a split spring steel ring 54 which retains the bar in position in the recesses 50 of the boss. Secured to the bar 52 I provide a shaft 55 which extends through a coaxial aperture 56 in the gear 45. The end of the shaft 55 is fluted as at 57 and extends into a similarly fluted aperture 58 provided in the propeller hub shaft 35, thus when the shaft 55 is rotated the propeller shaft 35 will be rotated.

Positioned in a coaxial aperture 59 in the gear 46 I provide a shaft 60 which is connected to the gear 46 by a bar 61 and a split ring 62 similar to the bar 52 and ring 54 just described in connection with the gear 45 and shaft 55. The other end of the shaft 60 is fluted as at 63 and is positioned in a similarly fluted portion 64 of an aperture 65 in the hub 66 of a clutch member 67.

The other portion 68 of the clutch includes a hub 69 which is supported in an antifriction bearing 70 in a transverse member 71 which is secured to the support 14 by bolts 72 and nuts 73. The portion 68 of the clutch also includes a stud shaft 74 which extends into the aperture 65 of the clutch portion 67 and helps to support the clutch portion 67.

The hub 66 of the clutch portion 67 is positioned in an antifriction bearing 75 and is slidable therein. The antifriction bearing 75 is supported in a transverse member 76 which is secured to the support 14 by bolts 77 and nuts 78.

For retaining the clutch member 67 in engagement with the clutch member 68 I provide a coiled spring 79 surrounding the hub 66 and for moving the clutch member 67 into and out of engagement with the clutch member 68 I provide an arm 80 which is pivoted at one end to the support 14 as at 81. The opposite end of the arm 80 is formed into a yoke on which are provided projections 82 which are positioned in a groove 83 provided on the hub 66. Slackly connected to the arm 80 intermediate the length thereof as at 84 I provide a rod 85 which extends out of the support 14 through a packing gland 86 in the rear wall 19 thereof.

Adjacent each side of the arm 80 the rod 85 includes magnetic responsive portions 87 which are surrounded by solenoid windings 88, one of which is positioned in a boss on the transverse member 71 and the other of which is positioned in a boss on the transverse member 76. Suitable electric wiring may be provided to selectively operate the solenoids 88 from any desired position on the aircraft to disengage or engage the clutch members 67 and 68 and by extending the rod 85 out through the housing the clutch may be manually operated.

The hub 69 of the clutch member 68 is provided with a recess 89 in which a drive shaft 90 is secured in any desired manner. This shaft extends out of the support 14 through a packing gland 91 and may be either directly or indirectly connected to a prime mover of any desired type.

From the foregoing description it will be apparent that when the shaft 90 is rotated and the clutch members are in engagement the shaft 60 will be rotated through the medium of the clutch and will in turn rotate the bevel gear 46 which in turn will rotate the bevel gear 45 thereby rotating the shaft 55 which will rotate the propeller hub shaft 35 to drive the propeller 36.

Positioned in an aperture 101 in the pinion 97 I provide a shaft 102 which includes an enlarged cruciform head 103 which is positioned in a similarly shaped recess 104 in the pinion and retained in position therein by a plurality of set screws 105 as shown in Fig. 8. The opposite end of the shaft 102 is fluted as at 106 and positioned in a similarly fluted recess 107 of a hub 108.

The hub 108 is positioned at one end in an antifriction bearing 109 which is supported in the transverse member 71 and the opposite end in an antifriction bearing 110 which is supported in the rear wall 19 of the housing 14.

Integral with or rigidly secured to the hub 108 I provide a pair of spaced gears 112 and 113. The gear 112 meshes with another gear 114 which is loosely mounted on a shaft 115 and fixed to another gear 116.

The shaft 115 is positioned at one end in an antifriction bearing 117 which is supported by the transverse member 71 and at the other end in an antifriction bearing 118 which is supported by the rear wall 19 of the support 14.

As clearly shown in Fig. 3 the gear 113 meshes with an idler gear 120 which in turn meshes with a gear 121 which is loosely mounted on the shaft 115 and fixed to another gear 122.

For driving the gears 116 and 122 I provide a gear 123 on the drive shaft 90 and which is normally positioned intermediate the gears 116 and 122 as shown in Fig. 2 and is shiftable into mesh with either one or the other of the gears 116 or 122. The gear 123 includes a hub portion having an annular groove 124 thereon and rotation is imparted from the shaft 90 to the gear 123 by means of a spline 125.

For shifting the gear 123 I provide an arm 126 which is pivoted at one end as at 127 to the support 14. The opposite end of the arm 126 is formed into a yoke and is provided with lugs 128 which are positioned in the annular groove 124 of the hub of the gear 123.

For moving the arm 126 I provide a rod 129 which is slackly connected thereto as at 130 and which extends out of the support 14 through a packing gland 131 in the rear wall 19. The rod 129 adjacent each side of the arm 126 includes magnetic responsive sections 132 which form the cores of solenoid magnets 133 one of which is supported by the transverse member 71 and the other by the rear support wall 19.

Suitable electric wiring may be provided to selectively operate the solenoids 133 from any desired location on the aircraft to move the arm 126 and by extending the rod 129 out through the rear wall 19 of the support the arm 126 may be manually moved.

When it is desired to rotate the housing 17 the clutch member 67 is disengaged from the clutch member 68 and the arm 126 is moved to shift the gear 123 into mesh with either the gear 116 or 122 depending on which direction it is desired to rotate the housing 17.

When the gear 123 meshes with the gear 116 it rotates the gear 116 and the gear 114 which in turn rotates the gear 112 thereby rotating the hub 108, the shaft 102 and the worm pinion 97 thereby rotating the housing 17.

When it is desired to rotate the housing 17 in the opposite direction the gear 123 is shifted into mesh with the gear 122 which when it is rotated will rotate the idler gear 120 which in turn rotates the gear 113 thereby rotating the hub 108, the shaft 102 and the worm pinion 97 thereby rotating the housing 17.

To retain the housing 17 in the position to which it is moved I provide a disk 135 on the hub 108 which is provided in its periphery with a plurality of spaced notches 136. Below the disk 135 I provide a polygonal bar 137 which is slidable in bearings 138 and is provided with an upstanding tooth 139. Slackly connected to the bar 137 as at 140 I provide an arm 141 which is suitably secured to the arm 126 as by bolts and nuts 142. When the arm 126 is moved to shift the gear 123 the arm 141 will move with it. Normally the tooth 139 of the bar 137 is positioned in one of the notches 136 of the disk 135 thereby preventing rotation of the hub 108. When the arm 126 is shifted to engage the gear 123 with either the gear 116 or 122 to turn the housing 17 the arm 141 moves the tooth out of the notch in the disk 135 wherefore the hub 108 is free to rotate. When the housing 17 has reached the desired position and the gear 123 is shifted out of mesh with either the gear 116 or 122 the arm 141 moves the tooth 139 into another notch on the disk 135 thereby retaining the housing 17 in the position to which it has been moved.

By providing the packing glands 91, 86 and 131 and the packing member 28 the housing and the casing may be filled with a lubricant so that all of the parts will be lubricated when in operation.

Suitable covered inspection ports such as indicated 144 and 145 may be provided to allow access to the various parts and to facilitate in the assembling and repair of the device.

From the foregoing description it will be apparent that I have provided a novel propeller shifting and operating device which is simple in construction and highly efficient in use.

Having thus described my invention, I claim:

1. An aircraft including a body having a support thereon, a housing mounted to rotate on said support, a pair of spaced radial bearings in said housing, a thrust bearing in said housing disposed between said radial bearings, a propeller drive shaft engaging said bearings, a bevel gear engaging one of said radial bearings, means to connect said bevel gear to said propeller drive shaft, means to drive said bevel gear and means to rotate said housing.

2. In an aircraft having a body portion, a support, a flange on said support, a housing having an annular flange thereon, a retaining ring secured to said support, said retaining ring having an annular flange thereon spaced from said first flange, a housing having a flange thereon fitted between said two flanges, antifriction means for supporting said housing flange between said spaced flanges, said housing including an annular portion, said portion being disposed adjacent said retaining ring flange and packing means to prevent leakage between said portion said retaining ring flange.

3. In an aircraft a body, a propeller support on said body, a wall mounted on said support, thrust and radial bearings on said support for said wall, a propeller housing on said wall, a drive shaft mounted in said support, a propeller mounted on said housing, means for driving said propeller from said drive shaft, said propeller housing being oil tight, and said propeller support being oil tight, a rack on said propeller housing, a pinion meshing with said rack and selective means to drive said pinion in either direction from said drive shaft.

4. In an aircraft a body, a propeller support on said body, a housing, thrust and radial bearings on said support for said housing, said housing and said propeller support having aligned bearings thereon, a drive shaft mounted on one of said aligned bearings, a bevel gear mounted on the other of said aligned bearings, a propeller shaft on said housing and means independent of said bearings for driving said propeller shaft from said drive shaft.

5. In an aircraft a body, a propeller support on said body, a housing, thrust and radial bearings on said support for said housing, said housing and said propeller support having aligned bearings thereon, a drive shaft mounted on one of said aligned bearings, a bevel gear mounted on the other of said aligned bearings, a plurality of aligned bearings in said housing, a propeller shaft in one of said bearings, a bevel gear mounted in the other of said bearings, said bevel gears being in mesh and means independent of said bearings for driving said propeller shaft from said drive shaft.

6. In an aircraft, a body, an elongated propeller support fixed on said body and projecting outwardly therefrom, a housing, means to mount said housing to swing on the outer end portion of said propeller support, a bearing in said housing, a propeller shaft in said housing and engaging said bearing, a propeller on said propeller shaft, a drive shaft associated with said propeller support, means connecting said propeller shaft and said drive shaft whereby said drive shaft drives said propeller shaft, a gear member mounted to move said housing when the gear member is moved and means to move said gear member to swing said housing and thereby alter the angle of thrust of said propeller.

7. In an aircraft, a body, an elongated propeller support secured to said body, a housing mounted on the outer end portion of said propeller support, a propeller mounted on said housing, said propeller including a propeller shaft, a drive shaft, means connecting said propeller shaft and said drive shaft whereby upon rotation of said drive shaft the propeller shaft will be rotated, means within said body for driving said drive shaft, gear means within said housing for rotating the same, other gear means coacting with said last mentioned means for operating the same and a member extending towards said body for operating said other gear means whereby said housing may be swung to thereby alter the angle of thrust of said propeller.

In testimony whereof, I hereunto affix my signature.

CHARLES S. HALL.